United States Patent
Bailey et al.

[11] Patent Number: 6,131,056
[45] Date of Patent: Oct. 10, 2000

[54] CONTINUOUS ATTITUDE CONTROL THAT AVOIDS CMG ARRAY SINGULARITIES

[75] Inventors: David A. Bailey, Glendale; Christopher J. Heiberg, Peoria; Bong Wie, Phoenix, all of Ariz.

[73] Assignee: Honeywell International Inc., Morristown, N.J.

[21] Appl. No.: 09/039,869

[22] Filed: Mar. 16, 1998

[51] Int. Cl.[7] ............................. B64G 1/28; G06F 17/00
[52] U.S. Cl. ............................. 701/13; 701/13; 701/4; 244/165; 244/164; 901/2
[58] Field of Search ............ 701/4, 13; 244/164, 244/165

[56] References Cited

U.S. PATENT DOCUMENTS

| | | | |
|---|---|---|---|
| 3,813,067 | 5/1974 | Mork | 244/3.22 |
| 3,834,653 | 9/1974 | Perkel | 244/166 |
| 3,968,352 | 7/1976 | Andeen | 701/13 |
| 4,062,509 | 12/1977 | Muhlfelder et al. | 244/166 |
| 4,071,211 | 1/1978 | Muhlfelder et al. | 244/165 |
| 4,489,383 | 12/1984 | Schmidt, Jr. | 701/13 |
| 4,567,564 | 1/1986 | Bittner et al. | 701/4 |
| 4,893,254 | 1/1990 | Chan et al. | 700/263 |
| 5,080,307 | 1/1992 | Smay et al. | 244/164 |
| 5,276,390 | 1/1994 | Fisher et al. | 318/568.1 |
| 5,499,320 | 3/1996 | Backes et al. | 700/260 |
| 5,681,012 | 10/1997 | Rosmann et al. | 244/165 |
| 5,692,707 | 12/1997 | Smay | 244/165 |

OTHER PUBLICATIONS

Kuhns, M.D.; Rodriguez, A.A., "Singularity Avoidance Control Laws for a Multiple CMG Spacecraft Attitude Control System", American Control Conference, 1994 vol.:3, pp. 2892–2893.

Cornick, D.E., "Singularity Avoidance Control Laws for Single Gimbal Control Moment Gyros," American Institute of Aeronautics and Astronautics, Inc., 1979.

Kraft, R.H., "CMG Singularity Avoidance in Attitude Control of a Flexible Spacecraft," Proceedings of the American Control Conference, San Francisco, CA, Jun. 1993.

Bedrossian,N.S.; Paradiso, J.; Bergmann, E.V.; Rowell, D., "Steering Law Design for Redundant Single–Gimbal Control Moment Gyroscopes," Journal of Guidance, Control, and Dynamics, vol. 13, No. 6, 1991, pp. 1083–1089.

*Primary Examiner*—Michael J. Zanelli
*Assistant Examiner*—Eric M. Gibson
*Attorney, Agent, or Firm*—Robert E. Greenstien

[57] ABSTRACT

A system for avoiding singularities in a control moment gyro (CMG) array of a satellite uses closed and open loop control of the CMGs for reorientation of the satellite. A control system detects when closed loop control according to pseudo inverse rules will cause a singularity and issues a signal. The CMGs are then controlled open loop to avoid the singularity. The pseudo inverse singularity problem arises where there are more actuators than dimensions in the controlled space. Accordingly, the invention may also be used in a robotic arm manipulator.

5 Claims, 3 Drawing Sheets

CONTINUOUS ATTITUDE CONTROL THAT AVOIDS CMG ARRAY SINGULARITIES

CROSS REFERENCE TO RELATED APPLICATIONS

This application discloses material discussed in the previously filed application titled Orienting A Satellite With Controlled Momentum Gyros, by David A. Bailey, filed on Sep. 2, 1997, Ser. No. 08,923,742 and these simultaneously filed applications: Robust Singularity Avoidance In A Satellite Attitude Control, by Bong Wie, David A. Bailey, and Christopher J. Heiberg, Ser. No.; CMG Control Based On Angular Momentum to Control Satellite Attitude, by David A. Bailey Ser. No.; Escaping Singularities In A Satellite Attitude Control, by Christopher J. Heiberg and David A. Bailey, Ser. No.

TECHNICAL FIELD OF THE INVENTION

This invention relates to satellites and robotic systems, for example controlling the orientation of a satellite using a plurality of control moment gyros (CMG).

BACKGROUND OF THE INVENTION

The attitude of an agile spacecraft or satellite is often maintained and adjusted with a control moment gyro array because those devices provide high torque and torque amplification. A typical CMG is a rotating mass suspended on a gimbal with an actuator to rotate it on the gimbal axis, producing torque and accumulating angular momentum. Angular momentum is the integral of torque over time. An array of n>3 CMGs is often used, allowing attitude control with some redundancy. Each CMG has an angular momentum (h) constrained essentially to a plane, the angular momentum vector of the gyro is nearly orthogonal to the gimbal axis. The error in orthogonality is small enough that it does not affect the operation of the CMG, the array of CMGs, or the attitude control of the satellite. The wheel speed of the CMG is essentially constant in most applications, but does not have to be for this invention to work. The torque produced by the CMG, Q is the result of the cross product $Q=\dot{\delta} \times h$, where $\dot{\delta}$ is the gimbal rate and h is the angular momentum of the rotor, if varying wheel speed is incorporated then there is an additional term $Q=\dot{\delta}\times h+\dot{h}$, where the angular momentum h is defined as $h=J\Omega$, and $\dot{h}=J\dot{\Omega}$, where J is the moment of inertia of the rotating wheel and $\Omega$ is the rotational rate of the wheel.

Classically the attitude control calculates the desired attitude rates for the satellite $\omega_d$, being the three axis attitude rates. The gimbal angle ($\delta$) rates for the CMG array are calculated using the pseudo inverse control law, $\dot{\delta}=A^T(AA^T)^{-1}J_s\dot{\omega}_c$, where $J_s$ is the satellite moment of inertia matrix, and A is the Jacobian of CMG array angular momentum with respect to gimbal angle, $$A = \frac{\partial h}{\partial \delta},$$

where h is the sum of the angular momentum of the CMG array, $$h = \sum_{i=1}^{n} h_i.$$

Since the A matrix is a function of the gimbal angles and the gimbal angels change in order to produce torque on the spacecraft the rank of A can drop from 3 to 2, which is a singular condition and the pseudo inverse cannot be calculated.

DISCLOSURE OF THE INVENTION

An object of the present invention is to significantly increase the speed in reorienting a satellite between two objects by utilizing more of the available angular momentum from the CMGs.

According to the invention, some CMGs are reoriented with a closed loop control while some are reoriented open loop.

According to the invention the torque command is calculated as before, $\dot{h}_c=J_s\dot{\omega}_c$. Using $\dot{h}_c$ the direction of the torque is known. The angular momentum is the integral of torque so the maximum integral of torque in the direction of $\dot{h}_c$ is the saturation angular momentum in that direction. The gimbal angles for saturation angular momentum are unique, thus the unique gimbal angles for saturation angular momentum in the direction of $\dot{h}_c$, $\delta_{hs}$ are calculated. Using the actual gimbal angles $\delta_A$ and the saturation gimbal angles $\delta_{hs}$ the correct direction of motion for the gimbal angles can be calculated for the shortest path to the saturation angular momentum. If a gimbal angle direction using the modified pseudo inverse $\dot{\delta}=A^T(AA^T+kI)^{-1}\dot{h}_c$ is in the wrong direction for a particular CMG, that CMG is gimbaled open loop to the saturation angular momentum gimbal angle. The remaining CMGs are controlled closed loop using the modified pseudo inverse control.

Other objects, benefits and features of the invention will be apparent from the following discussion of one or more embodiments.

BEST MODE FOR CARRYING OUT THE INVENTION

Figure 1:
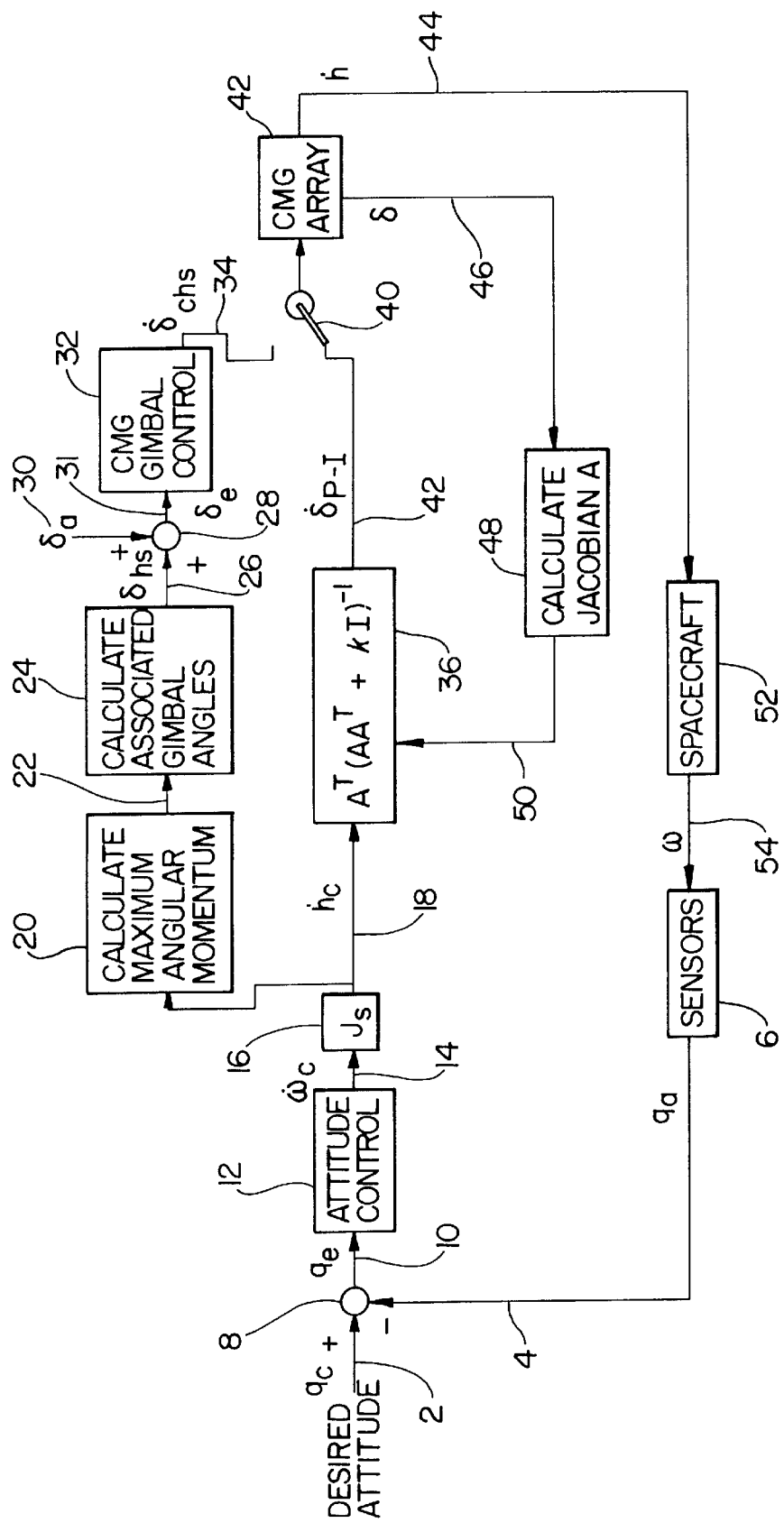
FIG. 1 is a functional block diagram showing a control embodying the present invention to rotate a satellite in response to commanded rotation signal $q_c$.
Figure 2:
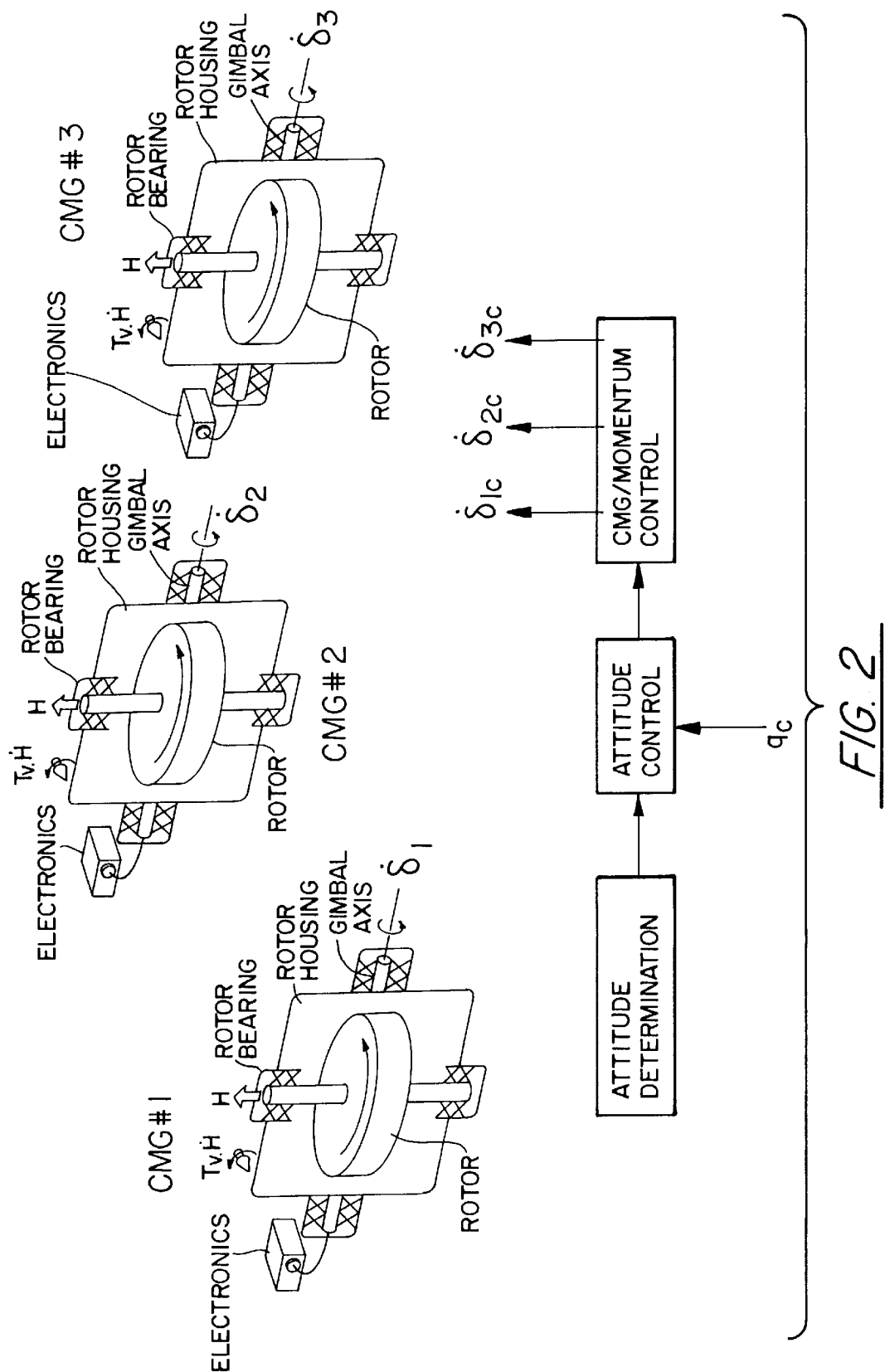
FIG. 2 is a block diagram showing a satellite with CMGs that are rotated to change the satellite's attitude in response to individually produce angular rate signals.
Figure 3:
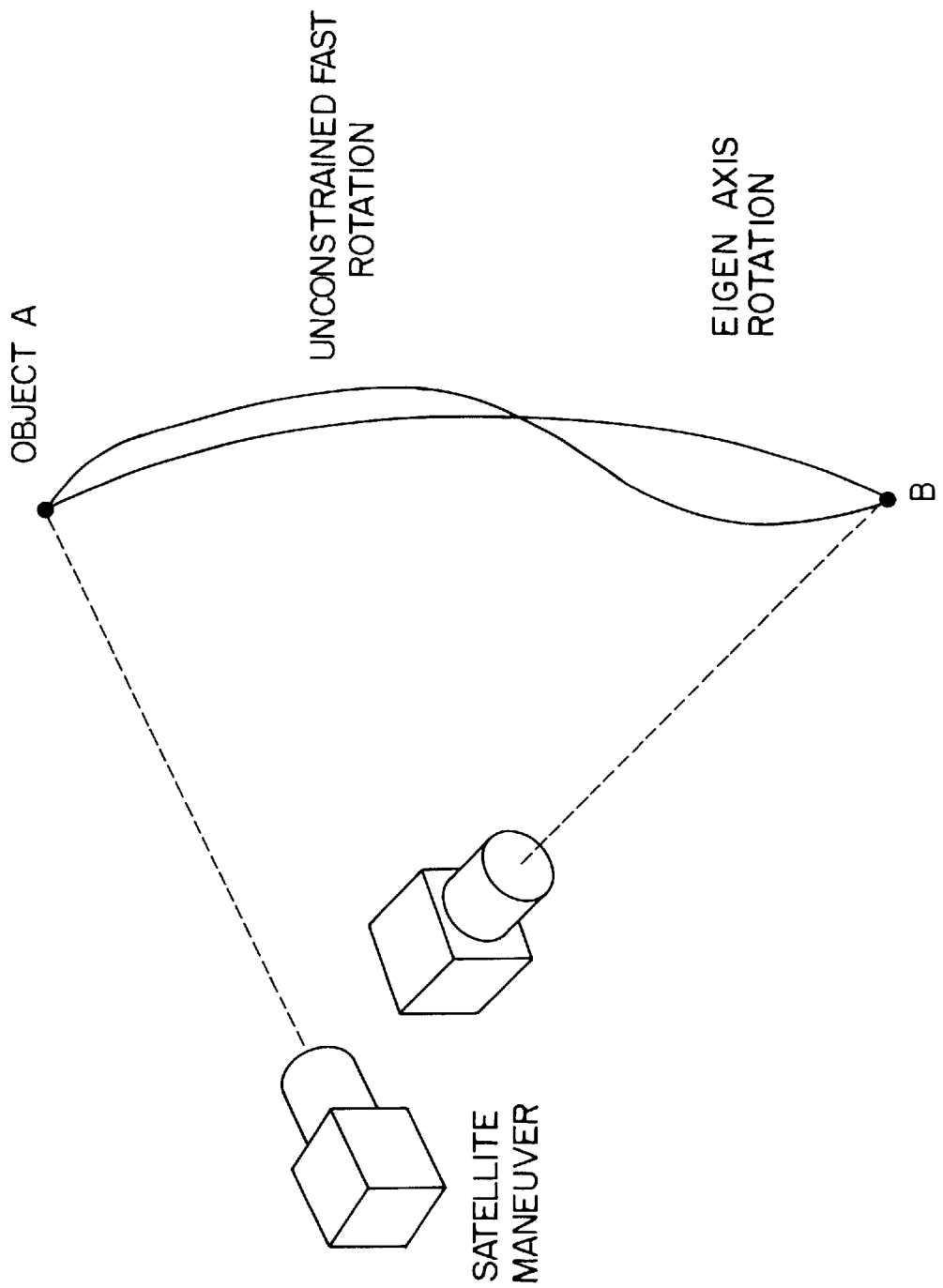
FIG. 3 illustrates two possible paths for reorienting between two objects.

It will be appreciated that FIG. 1 shows function blocks that may be implemented through hardware or software, preferably the latter in a computer based satellite control containing one or more signal processors programmed to produce output signals to control CMGs on the satellite as explained hereafter. Fundamentally the process is shown for a single signal path between two points, but it should be understood that single lines represent vector data which is 3 dimensional for the satellite attitude, attitude rate and torque, and n dimensional for the signals related to the n CMGs. FIG. 1 shows three (n=3) CMGs. The control scheme shown in FIG. 1 is used to pan or rotate the satellite on its axis from the line of sight view of an object A to a line of sight view of object B in FIG. 2. A typical closed loop control follows an eigen axis rotation path "old" by controlling the CMG's based on the actual (determined from the attitude determination system ADS in FIG. 3) and desired path attitude. The invention, however, is not constrained to follow an eigen axis path as will be explained. The desired satellite attitude at input 2, presented as Euler angles, quaternions, Gibbs parameters, or some other convenient way of describing the attitude of a satellite, compared at 8 with actual attitude at input 4 generated by the Inertial Measurement Unit (IMU) 6 or some other method for determining satellite attitude. The attitude error 10 is used by the attitude control 12 to generate a desired body rate, $\omega_c$ at output 54. The torque command, $\dot{h}_c$ at output 18 is calculated at 16 from the space craft inertial matrix, J, $\dot{h}_c = J\dot{\omega}_c$. The modified pseudo inverse is used to calculate the close loop gimbal rates, $\dot{\delta}_{P-I}$(38), $\dot{\delta}_{P-I} = A^T(AA^T + kI)^{-1}\dot{h}_c$ (36), The added term kI is to keep the equation from becoming indeterminate as the solution trajectory passes through internal singularities, that would be inescapable if this control was not used. At the beginning of a transient created by receipt of a new attitude command, the torque command $\dot{h}_c$ produced at 18 is used to calculate at 20 the maximum angular momentum $H_{max}$, produced at 22, which is the maximum angular momentum available from the array (n CMGs) in that direction of $\dot{h}_c$. $H_{max}$ is a saturation angular momentum which results in a unique set of gimbal angles $\delta_{hs}$, produced at 26, that yield the saturation angular momentum. The saturation gimbal angles are compared at 28 with the actual gimbal angles $\delta_a$, produced at 30 and the gimbal angle error $\delta_e$, produced at 31 and are used by the gimbal control 32 to generate gimbal rate command $\dot{\delta}_{chs}$ at 34, which represents the direction of rotation that gives the shortest path to the saturation angular momentum. If any CMG(s) is gimballing away from the saturation gimbal angle then it is individually switched at 40 to the shortest path. While CMG(s) is switched out of the closed loop control a portion of the cross axis motion generated by the switched out CMG(s) is added to the desired attitude so that the closed loop CMGs do not remove the effect. As the open loop CMG finishes its maneuver to the saturation surface the cross axis effect will be taken back out. The gimbal rate command 34 or 42 depends on the switch position command the gimbal control 42. The gimbal control changes the gimbal angles, which exerts a torque on the satellite and affects the reading from the sensors 6, which closes the control loop.

The invention has been explained in the context of a satellite control, but it can be used in systems, such as robotic systems, which can encounter singularities. With the benefit of the previous discussion of the invention, one of ordinary skill in the art may be able to modify the invention and the components and functions that have been described in whole or in part without departing from the true scope and spirit of the invention.

What is claimed is:

1. A satellite attitude control comprising a plurality of control moment gyros, an attitude controller comprising signal processing means for providing a gimbal rate signal, for each control momentum gyro, to operate an actuator to rotate each control moment gyro to change the attitude of a vehicle from a first attitude to a second attitude in response to a commanded attitude signal and an inertial measurement unit for providing signals manifesting vehicle rotation, comprising:

the signal processing means comprises:
means for producing, for one of said control moment gyros, an error signal manifesting the difference between the commanded attitude and an actual attitude manifested by an attitude control signal, produced by the inertial measurement unit, and for producing from said error signal the gimbal rate signal according to a closed loop control and for producing a singularity signal manifesting that said closed loop produces a singularity for said error signal, for producing, in response to said singularity signal, said gimbal rate signal from an open loop control law sequence that causes said one control moment gyro to be rotated to apply its respective stored angular momentum in a direction that is approximated by a great circle between the first attitude and the second attitude on an imaginary sphere with a center at the center of rotation of the vehicle.

2. The satellite attitude control described in claim 1, wherein:
said closed loop control comprises pseudo inverse rules; and
the open loop control sequence causes said one control moment gyro to rotate the vehicle to the second attitude in the shortest time.

3. A satellite attitude control comprising:
a plurality of control moment gyros;
means for producing a command to rotate the satellite from a first to a second spherical location on an imaginary spherical surface around the satellite;
means for providing gimbal signals to the control moment gyros to cause the satellite to rotate along a path on the spherical surface to the second spherical using closed loop control for the rotation of each control moment gyro as function of the difference between actual satellite spherical location and the second spherical location;
means for producing a signal manifesting that the closed loop control for at least one control moment gyro produces a singularity and controlling the rotation of said one control moment gyro with open loop control.

4. The satellite described in claim 3, wherein:
said open loop control comprises rotating said one control moment gyro to produce its maximum available angular rate of rotation on the satellite.

5. A robotic system comprising a plurality of actuators acting on an element, the actuators controlled by a signal processor using closed loop control according to a control law wherein the signal processor comprises:
means for producing a singularity signal manifesting that said closed loop produces a singularity in the movement of the element and in response to said singularity signal operating one of the actuators open loop to avoid the singularity.

* * * * *